United States Patent [19]

Ogawa et al.

[11] Patent Number: 4,967,403
[45] Date of Patent: Oct. 30, 1990

[54] MULTI-FORMAT OPTICAL DISK AND READING DEVICE

[75] Inventors: Hiroshi Ogawa, Kanagawa; Yoichiro Sako, Tokyo, both of Japan

[73] Assignee: Sony Corporation, Tokyo, Japan

[21] Appl. No.: 196,013

[22] PCT Filed: Jul. 29, 1987

[86] PCT No.: PCT/JP87/00557
§ 371 Date: Apr. 20, 1988
§ 102(e) Date: Apr. 20, 1988

[87] PCT Pub. No.: WO88/01785
PCT Pub. Date: Mar. 10, 1988

[30] Foreign Application Priority Data

Aug. 25, 1986 [JP] Japan .................................. 61-198530
Aug. 25, 1986 [JP] Japan .................................. 61-198531
Sep. 30, 1986 [JP] Japan .................................. 61-232512

[51] Int. Cl.⁵ ............................................. G11B 7/00
[52] U.S. Cl. .............................. 369/44.26; 369/275.3
[58] Field of Search ................. 369/275, 111, 43, 44, 369/45, 46, 32, 26, 275.3; 360/77.03, 77.08

[56] References Cited

U.S. PATENT DOCUMENTS

| 3,919,697 | 11/1975 | Walker | 360/77.08 |
| 4,443,870 | 4/1984 | Hazel et al. | 369/275 |
| 4,535,439 | 8/1985 | Satoh et al. | 369/275 |
| 4,669,077 | 5/1987 | Gerard et al. | 369/275 |
| 4,707,816 | 11/1987 | Yonezawa et al. | 369/275 |
| 4,761,772 | 8/1988 | Murakami | 369/275 |

FOREIGN PATENT DOCUMENTS

| 58-155549 | 9/1983 | Japan | 369/275 |
| 61-5442 | 1/1986 | Japan | 369/275 |
| 61-170938 | 8/1986 | Japan . | |

Primary Examiner—Donald McElheny, Jr.
Attorney, Agent, or Firm—Philip M. Shaw, Jr.

[57] ABSTRACT

A disk device which reproduces at least a disk (1) in which a servo signal region (3) in which a pit for servo and the like are formed and a data and address signal region (4) on which data and address are written are alternatingly provided along the circumferential direction of the disk (1), and in which signals are recorded depending upon two or more kinds of physical changes on the data and address signal regions (4) among the servo signal regions (3). A signal recorded depending upon one physical change is switched into a signal recorded depending upon another physical change in the servo signal region (3) or in a no-signal recording region (5c). Therefore, margin is provided for the operation of switching the signals of various recording types, and stable operation can be maintained even when the data are transferred at higher speeds.

6 Claims, 5 Drawing Sheets

MULTI-FORMAT OPTICAL DISK AND READING DEVICE

TECHNICAL FIELD

This invention relates to a disk device for at least reproducing an opto-magnetic disk or the like and a disk-like recording medium employed in such device. More particularly, it relates to a disk device for reproducing a disk on which time sharing servo signals, such as so-called sector servo signals, are previously recorded on the disk, and to a disk-like recording medium, such as the aforementioned opto-magnetic disk.

BACKGROUND ART

Recently, disk like recording media, such as optical disks or photo magnetic disks utilizing the optical or magneto-optical signal recording/reproducing method, have been developed and presented to the market. These disk-like recording media may be classified into three types of disks according to their recording format. These are 1) a so-called read-only memory or ROM type disk, like the digital audio disk such as a compact disk or CD or video disk, in which various information signals are previously recorded by the manufacturer on the disk-like recording medium which cannot be rewritten and provided in this form to the users; 2) a so-called programmable ROM or PROM type disk, also called DRAW or write once type, in which the information signals can be written only once by the users; and 3) a so-called random access or RAM type disk, like the opto-magnetic disk, in which recorded information signals can be erased and rewritten.

These various type disks have evolved separately and at different times so that they make use of distinct formats. Because of the lack of interchangeability among these various type disks, and the resulting inconveniences to both users and manufacturers, a demand for unifying the formats has been raised by both groups. To realize a unified format, it is proposed to introduce the concept of a so-called sampling servo according to which, as with the so-called sector servo in a hard disk in the field of magnetic disks, servo signals are recorded at prescribed intervals or angular intervals on concentric or convolute tracks on the disk, these discrete servo signals being sampled and held during the disk revolution to effect continuous servo control.

This unified format includes not only a disk in which the signal recording format is limited to one of the several recording formats above, but also are in which signals are recorded in two or more recording formats on one disk. In the case of an opto-magnetic disk, for example, the servo and address signals are previously recorded by a so-called embossing, for example of mechanical pits or a pattern of projections and recesses, or bumps, and the data signals are photo-magentically recorded by the user.

It is noted that, in the reproducing the above-mentioned opto-magnetic disks, the light reflected by the recording surface is split by a beam splitter, operating on the principle of light polarization, so as to be detected by two photodetectors and the detected signals supplied from these photodetectors are summed to produce the address signals and servo signals recorded in the form of pits. The photo-magnetically recorded data signals are obtained by subtraction of the respective detected signals. The servo signals are processed by a servo signal circuit system using the aforementioned summed output signals; however, as for the address and data signals, a switching operation is required. For example switching is necessary at an input portion of the A/D converter of the reproducing signal processing system for supplying address and data signals after switching, since the signal processing system processes in a time-sharing manner.

However, when the address signals recorded in the form of pits and the photo-magnetically recorded data signals are formed consecutively in one data/address signal region 4 between servo regions 3 on one track 2, as shown in FIG. 9, it becomes necessary for the aforementioned switching to be carried out nearly instantaneously at the time of a shift from the address signal recording region to the data signal recording region during reproduction so that the switching occurs during a time interval shorter by about one digit than the interval of a window of a channel clock. In particular, when the disk is driven at a faster speed, with a higher data transfer rate, an extremely fast switching operation of the order of several nanoseconds is required, and increases the hardware load. Such a system is difficult to realize and expensive. It is noted herein that FIG. 9 shows the recording format for an arbitrary track, with the pits P as shown at line B in FIG. 9 practically formed for the recording format shown at A in FIG. 9.

It is therefore an object of the present invention to provide a disk device for at least reproducing a disk-like recording medium in which signal recording may be made in two or more physical recording formats between the servo signal regions, wherein, according to the present invention, the switching from one to the other of the physical signal recording formats at the time of reproducing the recording medium may be made with a timely margin. On the other hand, although it may be contemplated that signals be recorded in one data/address signal region 4 in accordance with one physical change, the number of bytes in one data-/address signal region 4 is usually more than the number of bytes of the address data of one sector, so that, for effective utilization of the recording region, it may occasionally be desirable that signals be recorded together, with two or more format changes in one region 4. It is therefore an object of the present invention to provide a disk-like recording medium in which multiple signals may be recorded between the servo signal regions in two or more physical formats, wherein, according to the present invention, the switching from one to the other of the physical signal recording formats at the time of reproducing the recording medium may be made with a timely margin.

DISCLOSURE OF THE INVENTION

According to the present invention, there is provided a disk device for at least reproducing a disk-shaped recording medium wherein servo signal regions in which servo signals are recorded and a data address signal regions in which at least data signals and address signals are written are formed alternately in the circumferential direction of the disk, in which signals are recorded in a first format and a second format which apparatus comprises a pickup for reading said recording signals in said first and second formats, and means for switching between said signals recorded in said first format and those recorded in said second format said switching means being controlled in operation by signals in said servo signal region. In the present disk device, switching among the signals of plural recording formats different from one another may be carried out during the time the servo signal regions are scanned such that a sufficient time can be provided for switching despite occasionally increased data transfer speed, with the result that the signal switching can be achieved with a timely margin or allowance.

According to the present invention there is also provided, a disk-shaped recorded medium wherein servo signal regions in which servo signals are recorded and data address signal regions in which at least data signals and data signals are written are formed alternately along the circumferential direction of the disk, in which signals are recorded in a single data address region in two formats. A recording area sufficient to allow the reproducing apparatus to switch between the signals recorded in said first format and the signals recorded in said second format. is provided between the signals. In the present disk-like recording medium, in the case wherein signal recording is made in one data/address signal region in two or more formats, the reproducing apparatus can be switched with a margin at the no-signal recording region provided between the signal recording portions.

BEST MODE FOR PRACTICING THE INVENTION

Figure 1:
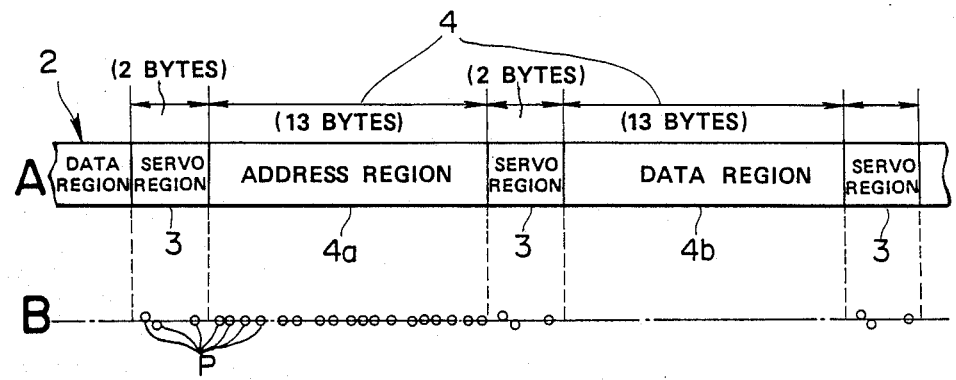
FIG. 1, A and B, is a diagram of a recording format for each track in an embodiment of the disk-like recording medium according to the present invention.

An opto-magnetic disk according to an embodiment of the present invention will be explained by referring to the drawings.

Figure 2:
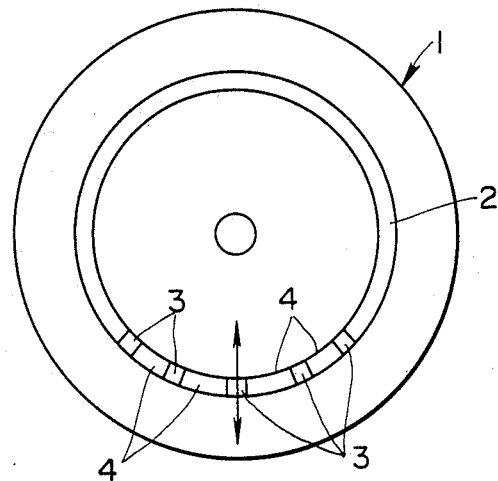
FIG. 2 is a planar view of a recording pattern for an opto-magnetic disk in the embodiment of FIG. 1.
Figure 5:
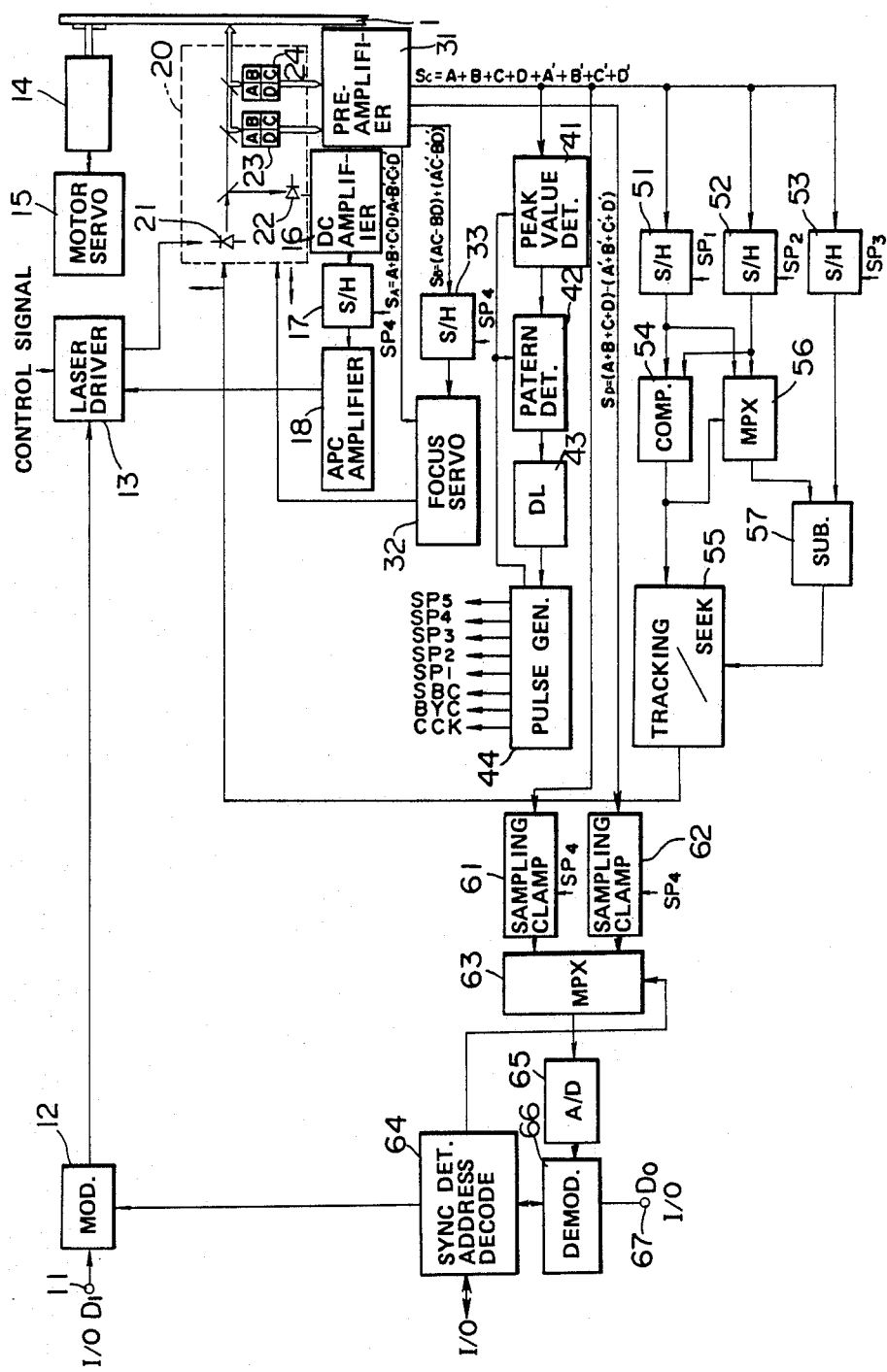
FIG. 5 is a block diagram of an opto-magnetic disk device employing the disk-like recording medium;, A and B.

In FIG. 1, there is diagrammatically shown a recording format of a given track 2 of the opto-magnetic disk 1 of the present embodiment (see FIG. 2) wherein pits P shown at B are recorded in the recording format shown in FIG. 2. Referring to FIGS. 1 and 2, servo signal regions 3 in which servo signals are recorded in the form of pits data and address regions 4 in which are written at least data signals and address signals are alternately formed along the circumferentially extending tracks 2 of the disk 1. In the data address signal regions 4, the address signals are recorded by pit formation in a first physical format, while the data signals in general are recorded by opto-magnetic recording in a second physical format. In each of the data address signal regions 4, only one of the address and data signals is recorded selectively. The overall arrangement for recording/reproducing such an opto-magnetic disk 1 is shown in FIG. 5 wherein an optical pickup 20 reads out the address and data signals as the recording signals in a first physical format, while a multiplexer 63 is provided as a swithing means for switching between the address and data signals from the optical pickup 20. The switching between these signals by the multiplexer 63 is caused to occur during the time of scanning of the servo signal regions.

The recording pattern on the opto-magnetic disk 1 and the recording format on the track will be explained in more detail.

Referring first to FIG. 1, the opto-magnetic disk 1 of, for example, a 5-inch type, has a diameter of the order of 13 cm, and a storage capacity of not less than 300 M bytes per side. The disk 1 is revolved at a constant angular velocity and, assuming that a track is formed with each disk revolution, tracks 2 are formed concentrically for recording the data. About 18,000 to 20,000 tracks are formed on one side with each track being divided into, for example, 32 sectors. Each track 2 consists of servo signal regions 3 in which servo pits are recorded and formed and data/address signal regions 4 into which data and address signals are written, as shown to an enlarged scale in FIG. 1, these regions being alternately formed along the circumferential direction. Several tens of sets of the servo signal regions 3 and the data/address signal regions 4 are provided in each sector. The servo signal region 3 has a length, calculated as the number of bytes here, equal to, two bytes, while a data/address signal region 4 has the length, calculated as the number of bytes here, equal to, 13 bytes.

Figure 3:
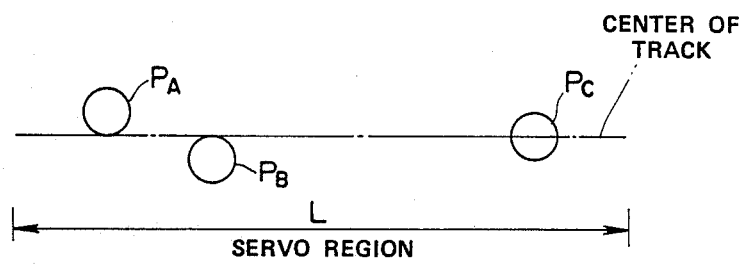
FIG. 3 is a diagram of the arrangement of the respective pit regions.
Figure 4:
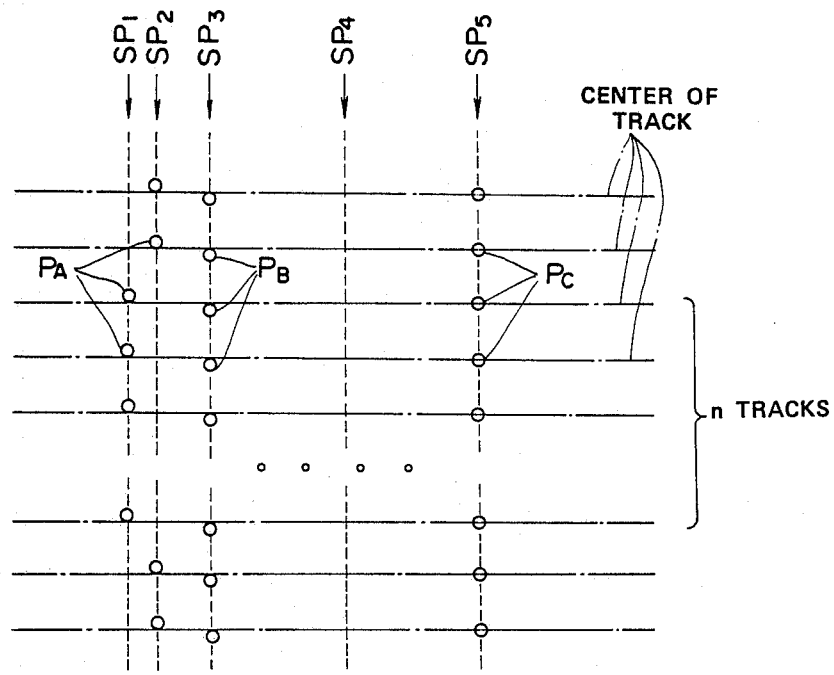
FIG. 4 is a diagram of the array of the pits along the radial direction of the disk.

In each servo signal region 3, three pits $P_A$, $P_B$ and $P_C$ are formed, as shown in FIG. 3. Pits $P_A$ and $P_B$ are formed with a vertical shift on both sides of a centerline of a track formed on the opto-magnetic disk 1 indicated by a chain dotted line, whereas the pit $P_C$ is formed on the centerline. These pits $P_A$, $P_B$ and $P_C$ are about 0.5 to 1.0 micron in diameter, while the actual length L of the servo signal region 3 in this example is about 15 to 30 microns. FIG. 4 shows the array of the pits $P_A$, $P_B$ and $P_C$ along the radial direction of the disk, that is, the direction shown by the arrow mark in FIG. 2. Thus the pits $P_B$ and $P_C$ are arranged linearly along a radius, whereas the pits $P_A$ are arrayed with a shift longitudinally on a given track at intervals of n pits, for example, 16 pits. The pit array with a shift at intervals of n pits is utilized for performing a traverse count for the optical pickup to find the track number being scanned, as described later. The pits $P_A$ are sampled by sampling pulses $SP_1$ or $SP_2$, while the pits $P_B$ and $P_C$ are sampled by sampling pulses $SP_3$, $SP_5$ and the mirror surface region between the pits $P_B$ and $P_C$ is sampled by sampling pulses $SP_4$ for producing various servo and clock signals as later described. Thus the servo signals of the present embodiment are used for performing a variety of control operations including focusing, tracking, clocking and traverse counting.

Sector address and data signals are recorded in the data/address signal regions 4 between the servo signal regions 3. Assuming that the effective data for one sector is comprised of, for example, 512 bytes, additional information and error detection/correction codes are recorded besides the effective data, so that a total of 670 to 680 bytes are recorded as such data. With a length of the data/address signal region 4 of 13 bytes, about 52 data/address signal regions 4 collectively constitutes one sector. Thus, one address signal region 4a is provided to, for example, 52 data signal regions 4b.

It is noted that the recording in one given data/address signal region 4 is effected with a recording format of a given physical format such that two or more different physical formats do not exist simultaneously. Thus, in the present embodiment, each data/address signal region 4 is allotted exclusively to the address signal region 4a or to the data signal region 4b, such that the -address information is previously recorded in the address signal region 4a in the form of pits similarly to the recording of the servo signals and the data signals including the aforementioned additional information and the error detection/correction codes are adapted to be recorded photomagnetically only in the data signal region 4b. The switching between the address and data signals at the time of reproduction is performed during the time the servo signal region 3 is scanned by the pickup 20. The servo signal area 3 has a length of 2 bytes, for example, as discussed above, so that a sufficient time allowance is provided to effect the signal switching.

Referring now to FIG. 5, the opto-magnetic disk apparatus for recording/reproducing the aforementioned the opto-magnetic disk L will be explained by referring to FIG. 5.

In FIG. 5, data to be recorded $D_1$ are supplied from, for example, a computer, through an interface to an input terminal 11. These data $D_1$ are supplied to a modulating circuit 12 where they are subjected to modulation including bit conversion, after which they are supplied to a laser drive circuit 13. Control signals of the write, read-out or erasure modes are supplied to the laser drive circuit 13, which is responsive thereto to issue drive signals for driving a laser diode 21 of an optical pickup 20 while also issuing drive pulse signals to the laser diode 21 during data recording and erasure at the timing of the channel clocks CCK acting as the reference clocks and high frequency drive signals during read-out to the same laser diode 21.

The optical pickup 20 includes, in addition to the laser diode 21, a photo-diode 22 and two photodetectors 23 and 24 each divided into four portions. The photodiode 22 senses the intensity of the laser beam emitted by the laser diode 21. The photodetectors 23 and 24 detect the aforementioned laser beam reflected by the opto-magnetic disk 1 by analyzers, with one of the photodetectors detecting the positive direction component of the kerr angle of rotation and the other the negative direction component of the kerr angle of rotation.

An electric motor 14 is servo-controlled from a motor servo circuit 15 through, for example, a phase locked loop or PLL, for causing revolutions of the opto-magnetic disk 1 accurately at a prescribed velocity (angular velocity).

The laser beam outputted from the aforementioned laser diode 21 irradiates the opto-magnetic disk 1, while also falling on the photodiode 22. The output of the photodiode 22 is supplied through a d.c. amplifier circuit 16 to a sample and hold circuit 17 (S/H) in an amount related to the laser beam intensity. In the S/H circuit 17, a sample and hold operation is performed by the sampling pulses SP$_4$, see FIG. 4, and the output from the S/H circuit 17 is supplied through an APC amplifier circuit 18 to the laser drive circuit 13 as the automatic power control or APC signals. In this manner, the intensity of the laser beam outputted from the laser diode 21 is maintained at a predetermined value.

The respective outputs of the photodetectors 23 and 24 of the optical pickup 20, on which the laser beam falls after reflection by the opto-magnetic disk 1 through an analyzer, not shown, are supplied to a preamplifier 31. A light detection signal $S_A$ which is the sum signal of the outputs of the respective light receiving regions of the photodetectors 23 and 24, i.e. $S_A = A+B+C+D+A'+B'+C'+D'$ inclusive of d.c. components, is directly supplied to a focus servo circuit 32, whereas a light detection signal $S_B$ composed of the outputs of the respective light receiving regions, wherein $S_B = (AC-BD) + (A'C'-B'D')$, is also supplied to the focus servo circuit 32 through the S/H circuit 33 adapted for effecting a sample and hold operation at the timing of the sampling pulses SP$_4$. Focus servo control signals, generated at the focus servo circuit 32 on the basis of the signals $S_A$ and $S_B$, are supplied to the optical pickup 20 to effect a focus control.

A light detection signal $S_C$ from the preamplifier 31, wherein $S_C = A+B+C+D+A'+B'+C'+D^1$, is supplied to each of a peak position detecting circuit 41, S/H circuits 51, 52 and 53 and to a sampling clamp circuit 61. The light detection signal $S_C$ is the signal detecting the pit patterns or patterns of recesses and projections in the servo signal region 3 and the address signal region 4a of the disk 1. In the peak position detecting circuit 41, the peak position of the light detection signal $S_C$ is detected. In a proper or intrinsic pattern detecting circuit 42, the pit pattern having an interval proper or intrinsic only to the interval between the pits $P_B$ and $P_C$ on the disk 1 is detected to detect the pit $P_C$, with the detection output being supplied through a delay circuit 43 to a pulse generator 44. Based on the detection output obtained in the proper pattern detecting circuit 42, the pulse generator 44 generates channel clocks CCK as reference clocks synchronized with the above pits $P_C$, while simultaneously generating byte clocks BYC, servo byte clocks SBC and sampling pulses SP$_1$, SP$_2$, SP$_3$, SP$_4$ and SP$_5$, see FIG. 4. The channel clocks CCK are supplied to all of the circuit blocks, in a manner not shown. The sampling pulses SP$_1$, SP$_2$ and SP$_3$ are supplied to the S/H circuits 51, 52 and 53, respectively. The sampling pulses SP$_4$ are supplied to the S/H circuit 17, 33 and to sampling clamp circuits 61 and 62. The sampling pulses SP$_5$ are used for example for detecting the movement direction of the optical pickup 20. Gating pulses are supplied from the pulse generator 44 to the peak position detecting circuit 41 and to the proper position detecting circuit 42.

In the S/H circuits 51, 52 and 53, the supplied light detection signals $S_C$ are subjected to sample and hold operation by the sampling pulses SP$_1$, SP$_2$ and SP$_3$. The outputs from the S/H circuit 51 and the S/H circuit 52 are compared in the signal level by a comparator 54. The comparator outputs are inverted at intervals of the consecutive n tracks, such as 16 tracks, in connection with the array of the pits $P_A$ on the disk 1 so as to be supplied to a tracking servo/seek circuit 55 as the traverse count signals and to a multiplexer 56. The signal from the S/H circuits 51 and 52 that is higher in signal level is selectively outputted from the multiplexer 56 so as to be supplied to a subtractor 57. In the subtractor 57, there is formed a difference signal between the signal from the multiplexer 56 and that from the S/H circuit 53, which difference signal is transmitted as the tracking error signal to the aforementioned tracking servo/seek circuit 55. The tracking servo/seek circuit 55 effects feed and tracking control for the optical pickup 20.

The light detection signals $S_C$ and $S_D$, wherein $S_D=(A+B+C+D)-(A'+B'+C'+D')$ are supplied from the preamplifier 31 to the sampling clamp circuit 61 and 62, respectively. The light detection signal $S_D$ is the detection signal of the data written in the data signal region 4b of the opto-magnetic disk 1. The light detection signal $S_C$ supplied to the sampling clamp circuit 61 is the detection signal of the addresses written in the region 4a. In the sampling clamp circuits 61 and 62, the respective signals are clamped by the above sampling pulses SP4 so as to be transmitted to the above multiplexer 63.

In the multiplexer 63, the switching select operation thereof is controlled by control signals from the sync detect/address decode circuit 64. Supposing that the light detecting signal $S_C$ is transmitted through the sampling clamp circuit 61 and the multiplexer 63 to an analog to digital or A/D converter 65 and thereby converted into a digital value before being transmitted to a demodulator 66, the output from the demodulator 66 is transmitted to the sync detect/address decode circuit 64 for detecting the sync signals and decoding the address information or data. The multiplexor 63 is controlled so as to be switched when the actual address coincides with the address information of the data supplied to be read through an interface from a computer, for example, so that the light detection signals $S_D$ for the data signal region 4b are transmitted to the A/D converter 65 and the demodulator 66 and the data $D_O$ obtained after demodulation including bit conversion are issued at the output terminal 67. These data $D_O$ are transmitted through an interface to a computer. At the time of data writing, control signals are transmitted from the sync detection/address decoding circuit 64 to the modulating circuit 12 and, in accordance with these control signals, the data to be written are transmitted from the modulating circuit 12 to the laser drive circuit 13.

It is noted that the switching control operation of the multiplexer 63 is not effected within the data/address signal region 4 on the track 2, but necessarily within the scanning period of the servo signal region 3. As discussed hereinabove, the servo signal region 3 is approximately two bytes and the multiplexer 63 can be switched with a sufficient time allowance even when the rotational speed of the disk and hence the data transfer rate are increased.

Figure 6:
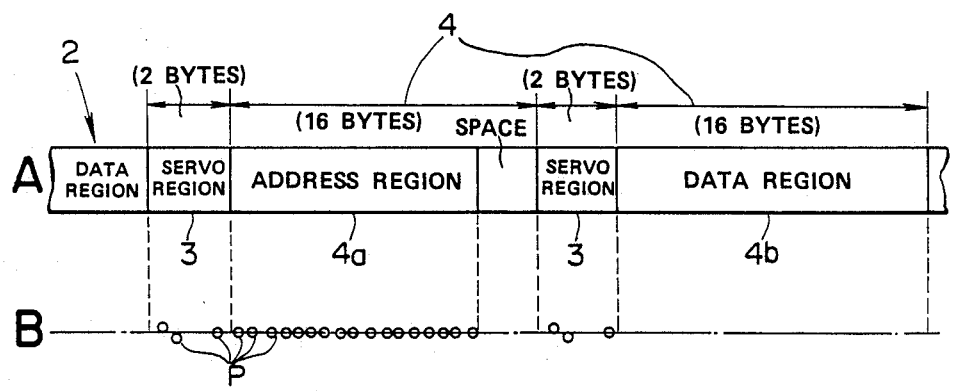
FIG. 6 is a diagram of the recording format of each track in a modified embodiment of the disk-like recording medium according to the present invention.

In the above embodiment, the address signals are recorded within the entire address signal region 4a of each of the data address signal region 4. However, as shown in FIG. 6, address signals may also be recorded on a portion of the region 4a, with the remaining portion being blank or free of signals. In this case, only one type of physical recording is effected within one region 4 so that a temporary allowance may be afforded to the switching of the reproducing signals. It is to be noted that such signal switching occurs within the servo signal, in the same manner as discussed hereinabove.

In general, the number of bytes in the data/address signal region 4 is larger than the number of bytes of the address data for one sector. Therefore, when it becomes necessary for effective utilization of the recording region that the signals recorded in two or more kinds of physical format exist together within one data/address signal region 4, an unrecorded region 5c may be provided between the address signal region 5a formed in one physical signal recording format and the data signal region 5b formed in another physical signal recording format, as in the case of the opto-magnetic disk shown in FIG. 7, and the signal switching may be effected in the interval of the unrecorded region 5c during reproduction so that signal switcing may be performed with a temporary allowance.

Figure 7:
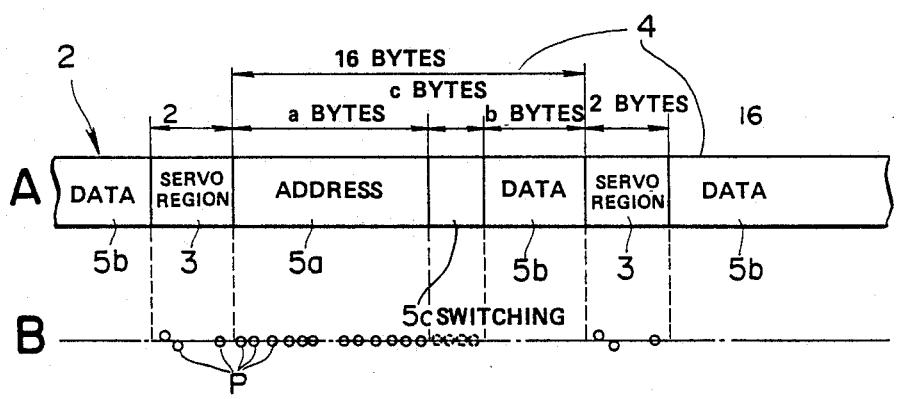
FIG. 7, A and B, is a diagram of the recording format of each track in another modified embodiment of the disk-like recording medium according to the present invention.

In FIG. 7, wherein the recording format of a given track 2 of the opto-magnetic disk in the present embodiment is schematically shown, similarly to the embodiment of FIG. 1, the pits P as shown at B are recorded for the recording format as shown at A. In FIG. 7, data/address signal regions 4 into which the data and address signals are recorded are provided between the respective signal regions 3 in which the servo signals are recorded in the form of pits, these regions 3 and 4 being alternately provided along the tracks of the disk circumferentially. In the data/address region 4, the address signals are recorded by the pit formation in one physical format and the general data signals are recorded by opto-magnetic recording in a second physical format, with both the address and data signals to be recorded in one data/address signal region 4.

It will be noted that at least the aforementioned sectorwise address and data signals are recorded in the data/address signal region 4 between the servo signal regions. For example, with the effective data within one sector being 512 bytes, data of a total of 670 to 680 bytes or thereabouts, inclusive of the additional information and error detection or correction codes, are recorded in one sector. With the length of the data/address signal region 4 being 16 bytes, 42 or more data/address signal regions 4, for example, are required to constitute the data of one sector. For example, 42 of 43 data recording regions 4 will be dedicated to data recording, the remaining one being used for recording of both addresses and data.

In this embodiment, when the address and data signals are recorded together in the aforementioned data/address signal region 4, an unrecorded region 5c is formed between the address signal region 5a and the data signal region 5b. The lengths of the address signal area 5a and the data signal region 5b are a and b in terms of the number of bytes. The unrecorded region 5c directly after the address signal region 5a has a length c in terms of the number of bytes that is sufficient to perform effectively the signal switching for reproduction as described later. More specifically, such length c may be 1 byte or thereabouts. It is noted that additional data that are not required during data reproduction, such as a data detected mark concerning the aforementioned address data, may be recorded in the form of pits in the unrecorded region 5c. Also the address information is previously recorded sector-wise in the address signal region 5a in the form of pits similar to those of the servo signals, while the data signals in the broad sense of the term, inclusive of the aforementioned additional information and error detection/correction codes, are recorded in the data signal region 5b by so-called photomagnetic recording.

Figure 8:
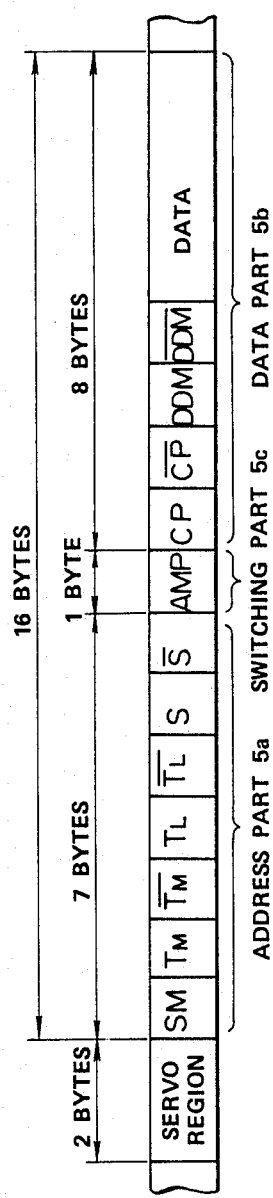
FIG. 8 is a diagram of a specific example of the record contents in one data/address signal region in the embodiment shown in FIG. 7.
Figure 9:
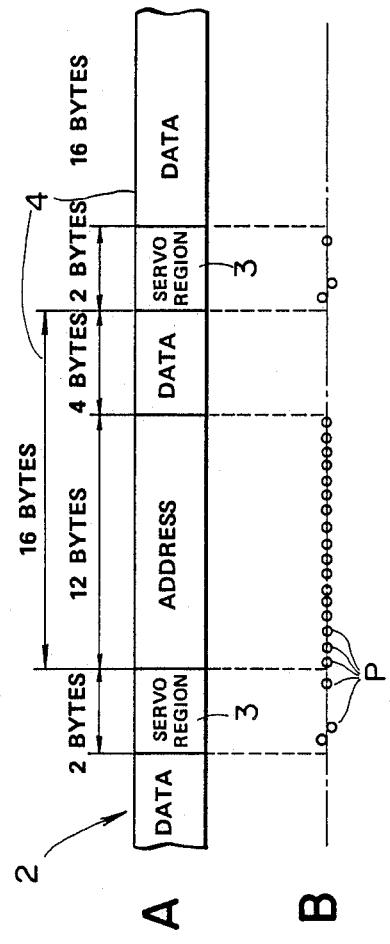
FIG. 9, A and B, is a diagram of the recording format of each track for understading the present invention.

A more specific example of the data/address signal region 4 in which the aforementioned address signal region 5a, data signal region 5b and the unrecorded region 5c between these regions 5a and 5b exist together, will be explained by referring to FIG. 8.

In this figure, there is recorded in the address signal region 5a within the data/address signal region 4 between the servo signal regions 3 a 1-byte sector mark SM, followed by an upper byte of the truck number $T_M$, a lower byte of the truck number $T_L$ and a sector number S, each being of one byte, along with the corresponding inversion data $\overline{T}_M$, $\overline{T}_L$ and $\overline{S}$. Although these data are recorded in the example of FIG. 6 in the sequence of $T_M$, $\overline{T}_M$, $T_L$, $\overline{t}_L$, S and $\overline{S}$, they may be recorded in any other desired sequence, such as S, $T_M$, $T_L$, $\overline{T}_L$, $\overline{T}_M$ and $\overline{S}$. It is to be noted that these address data are the pre-format data previously recorded in the form of so-called pits on the medium, as described hereinabove.

The address signal region 5a is directly followed by the unrecorded region 5c followed in turn by the data signal region 5b. In the data signal region 5b, there are recorded a copy protect data CP and a data deleted mark DDM, each being of 1 byte, along with the corresponding inversion data $\overline{CP}$ and $\overline{DDM}$. The 4-byte data CP, $\overline{CP}$, DDM and $\overline{DDM}$ are followed of a 1-byte data indicating the data type, composed e.g. by 2 bits indicating whether or not the file is a real-time file and 6 bits indicating whether the data is computer data in general, audio data or video data, this 1-byte data being in a quadruple format. It is noted that the aforementioned data DDM is used when the data recorded in the data/address signal region 4 is the programmable ROM (PROM) type data.

The present invention is not limited to the above described embodiments, but may be changed in many ways without departing from the purport of the invention. For example, the present invention may be easily applied to a disk-shaped recording medium on which signals may be recorded by three or more different kinds of physical changes. The number of bytes for one sector or that of the servo signal region or the data/address signal region may be optionally selected to be other than the numbers shown in the above embodiments.

What is claimed is:

1. A disk apparatus for at least reproducing a disk-shaped recording medium wherein servo signal regions in which pits for tracking are recorded at alternately offset positions with respect to the center of the track and pits for clock generation are recorded at the center position of the track, as servo signals, and data address signal regions into which at least data signals and address signals are written are formed alternately in the circumferential direction of the disk, and wherein signals are recorded in either a first signal format or a second signal format in each said data address signal region, such that there are signals in only one of said formats in any one of said data address signal regions, comprising:

a pickup for reading said signals in said data address regions in said first and second formats; and switching means responsive to said servo signals for switching between said signals recorded in said first change from said format and those recorded in said second format, such that switching takes place while said servo signal region is being read.

2. A disk apparatus according to claim 1 wherein said servo signals and said address signals are previously recorded on said disk-shaped recording medium as projections and recesses in the disk as said first format and said data signals are recorded photo-magnetically as said second format.

3. A disk apparatus according to claim 1 wherein the servo signal region on said disk-like recording medium has a length of 15 to 30 microns.

4. A disk-shaped recording medium for use in an apparatus for reading said medium, comprising a disk having tracks containing alternating servo signal regions and data address signal regions formed circumferentially around said disk, wherein said servo signal regions contain pits for tracking recorded at alternately offset positions with respect to the center of the track and pits for clock generation recorded at the center position of the track, as servo signals, and said data address signal regions contain at least data signals and address signals written in either a first or second signal format, and wherein signals recorded in said first format and signals recorded in said second format are separated by either a recording area sufficient to allow said apparatus for reading said disk to switch between the signals recorded in said first format and the signals recorded in said second format or one of said servo signal regions.

5. The disk recording medium according to claim 4, wherein said servo signals and said address signals are recorded in said first signal format as the change in the shape of projections and recesses and said data signals are recorded photo-magnetically in said second signal format.

6. A disk recording medium according to claim 4 wherein said servo signal region has the length of 15 to 30 microns.

* * * * *